United States Patent
Nakai

(10) Patent No.: US 8,503,495 B2
(45) Date of Patent: Aug. 6, 2013

(54) LASER DEVICE

(71) Applicant: Fujikura Ltd., Tokyo (JP)

(72) Inventor: Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/626,494

(22) Filed: Sep. 25, 2012

(65) Prior Publication Data

US 2013/0083817 A1 Apr. 4, 2013

Related U.S. Application Data

(63) Continuation of application No. PCT/JP2011/057473, filed on Mar. 25, 2011.

(30) Foreign Application Priority Data

Mar. 26, 2010 (JP) ................... 2010-073832

(51) Int. Cl.
*H01S 3/30* (2006.01)
*H01S 3/13* (2006.01)
*H01S 3/00* (2006.01)

(52) U.S. Cl.
USPC .............. 372/38.02; 372/6; 372/29.014

(58) Field of Classification Search
USPC ............ 372/6, 29.014, 29.021, 38.02
See application file for complete search history.

(56) References Cited

FOREIGN PATENT DOCUMENTS

| JP | 8-8832 A | 1/1996 |
|---|---|---|
| JP | 9-141476 A | 6/1997 |
| JP | 11-251669 A | 9/1999 |
| JP | 2007-42981 A | 2/2007 |
| JP | 2008-64875 A | 3/2008 |

OTHER PUBLICATIONS

International Search Report of PCT/JP2011/057473, mailing date of Apr. 19, 2011.

*Primary Examiner* — Armando Rodriguez
(74) *Attorney, Agent, or Firm* — Westerman, Hattori, Daniels & Adrian, LLP

(57) ABSTRACT

The laser device includes: a seed light source that outputs seed light; a pumping light source an amplification optical fiber as the amplifier that amplifies the seed light with an element pumped by the pumping light source; a monitor unit that is provided between the seed light source and the amplification optical fiber, and monitors the intensity of the light output from the amplification optical fiber; and a light source controller that controls the seed light source. In this laser device, when the light input to the monitor unit has an intensity equal to or higher than a predetermined intensity while the seed light is not input to the amplification optical fiber, the light source controller forces to output the seed light from the seed light source.

8 Claims, 2 Drawing Sheets

LASER DEVICE

TECHNICAL FIELD

The invention relates to laser devices, and more particularly, to a laser device that can prevent abnormal oscillations in the amplifier.

BACKGROUND ART

Laser devices are used in the fields of processing machinery, medical equipment, measurement instruments, and the like. With such laser devices, there are cases where output light is reflected by an object to be processed or the like, and the reflected output light is input to the output terminal of the laser device. There has been known laser devices that monitor such reflected light, so as to reduce damage to the laser devices and grasp the condition of the object to be processed.

Patent Document 1 listed below discloses such a laser device. In this laser device, output light that has been reflected by an object to be processed and been input as reflected light to the output terminal is isolated and monitored before reaching the light source.

CITATION LIST

Patent Document

[Patent Document 1] Japanese Patent Application Laid-Open No. 09-141476

SUMMARY OF INVENTION

Objects to be Achieved by the Invention

However, the laser device disclosed in Patent Document 1 listed above is used only for grasping the condition of the object to be processed and the condition of the laser guide by monitoring the light that is input as reflected light. In such a laser device, there are cases where part of the reflected light is not isolated, and travels toward the light source or the like. In a case where an amplifier is provided in the light source, abnormal oscillations might occur in the amplifier, and the light source might be damaged by the high-intensity light generated by the abnormal oscillations. Therefore, there is a demand for prevention of abnormal oscillations in the amplifier.

In view of the above, the invention aims to provide a laser device that can prevent abnormal oscillations in the amplifier.

Means for Achieving the Objects

A laser device of the invention includes: a light source that outputs light to be amplified; a pumping unit; an amplifier that amplifies the light to be amplified with an amplification medium pumped by the pumping unit; a monitor unit that is provided between the light source and the amplifier, and monitors the intensity of light output from the amplifier; and a light source controller that controls the light source. In this laser device, when the light input to the monitor unit has an intensity equal to or higher than a predetermined intensity while the light to be amplified is input to the amplifier, the light source controller forces to output the light to be amplified from the seed light source.

In this laser device, the intensity of the light that is output from the amplifier is monitored at a point between the light source and the amplifier while the light to be amplified is not input to the amplifier. Accordingly, the intensity of the light that is output from the amplifier toward the light source can be detected. In the amplifier that amplifies the light to be amplified with the pumped amplification medium, the level of the pumped state of the amplification medium pumped by the pumping unit is made gradually higher with time, while the light to be amplified is not input to the amplifier. The pumped amplification medium then emits spontaneous emission light. ASE (Amplified Spontaneous Emission), which is obtained by amplifying the spontaneous emission light, is output from the amplifier. There are cases where the ASE is reflected by an object to be processed or the like, and is again input to the amplifier. If the level of the pumped state of the amplification medium in the amplifier is high at this point, or if the intensity of the re-input ASE is high at this point, there is a possibility that abnormal oscillations will be induced in the amplifier. In the laser device of the invention, however, the intensity of the light that is output from the amplifier can be detected between the light source and the amplifier as described above, and accordingly, the intensity of the ASE that is output from the amplifier toward the light source can be detected. The intensity of the ASE that is output from the amplifier results from the influence of the pumped state of the amplification medium in the amplifier and the intensity of the ASE re-input to the amplifier. Therefore, if the intensity of the ASE that is output from the amplifier toward the light source is high, at least one of the following situations occur: the level of the pumped state of the amplification medium in the amplifier is high, and the intensity of the re-input ASE is high. Therefore, when the intensity of the ASE that is output from the amplifier is equal to or higher than the predetermined intensity, stimulated emission from the pumped amplification medium is reduced by the light to be amplified that is forced to be output under the control of the light source controller, and the level of the pumped state of the amplification medium in the amplifier can be made lower. As a result abnormal oscillations in the amplifier can be prevented.

Further, in the above described laser device, the light source preferably outputs pulsed light to be amplified in constant cycles, and, when the light input to the monitor unit has an intensity equal to or higher than the predetermined intensity, the light source controller preferably shortens the cycles in which the light to be amplified is output, to forces to output the light to be amplified from the seed light source.

In this laser device, the amplifier can be controlled not to be the state of abnormal oscillation during a pulse interval in the laser device that outputs pulsed output light in the constant cycles.

The above described laser device preferably further includes a pumping controller that controls the pumping unit. When the light input to the monitor unit has an intensity equal to or higher than the predetermined intensity, the pumping controller preferably controls the pumping unit to lower the level of the pumped state of the amplification medium.

In this laser device, the pumping unit is controlled by the pumping controller, to lower the level of the pumped state of the amplification medium in the amplifier. As a result abnormal oscillations in the amplifier can certainly be prevented with a higher degree.

Further, in the above described laser device, when the light input to the monitor unit has an intensity equal to or higher than the predetermined intensity, the pumping controller preferably stops the pumping unit.

In this laser device, the pumping unit is stopped by the pumping controller. As a result the pumped state of the amplification medium in the amplifier can certainly be made lower with a higher degree.

In the above described laser device, the pumping unit is preferably a pumping light source that outputs pumping light, and the amplifier is preferably an amplification optical fiber through which the light to be amplified propagates. The amplification optical fiber is doped with an active element to be pumped by the pumping light source.

With this laser device, abnormal oscillations in the amplification optical fiber can be predicted, and abnormal oscillations in the amplification optical fiber can be prevented.

Effect of the Invention

As described above, according to the invention, a laser device that can prevent abnormal oscillations in the amplifier can be provided.

EMBODIMENTS OF THE INVENTION

Figure 1:
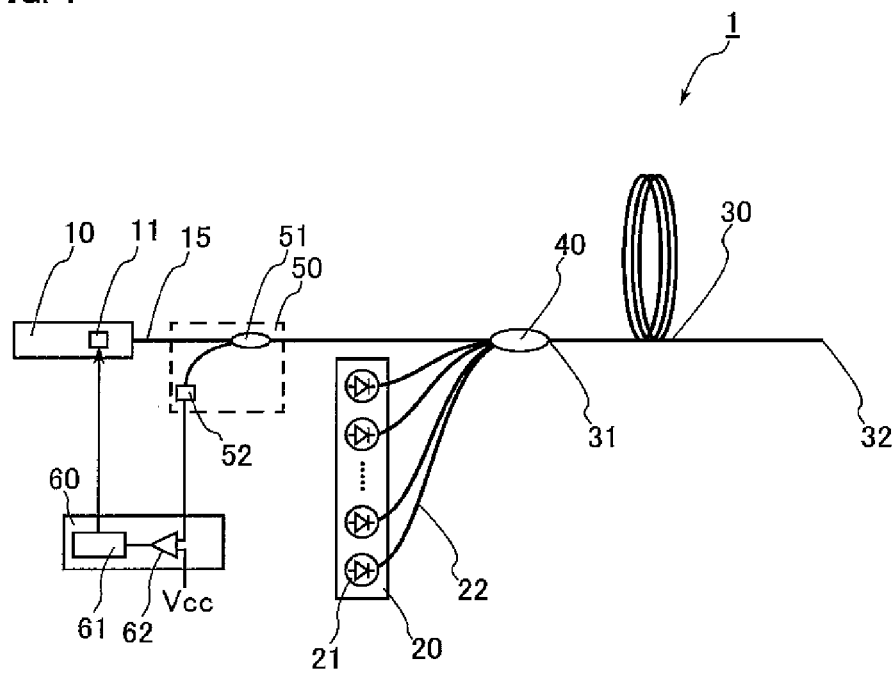
FIG. 1 is a diagram showing a laser device according to a first embodiment of the invention.

Suitable embodiments of a laser device according to the invention will be explained below referring to the drawings.
(First Embodiment)

FIG. 1 is a diagram showing a laser device according to a first embodiment of the invention.

As shown in FIG. 1, a laser device 1 is a fiber laser device that includes as main components: a seed light source 10 as the light source that outputs seed light as light to be amplified; a pumping light source 20 as the pumping unit that outputs pumping light; an amplification optical fiber 30 as the amplifier to which the seed light and the pumping light are input; a combiner 40 that connects the seed light source 10 and the pumping light source 20 to the amplification optical fiber 30; a monitor unit 50 provided between the seed light source 10 and the amplification optical fiber 30; and a control unit 60 that controls the seed light source 10. Accordingly, the laser device 1 is a so-called MO-PA laser device, with the seed light source 10 being a MO (Master Oscillator), the pumping light source 20 and the amplification optical fiber 30 being a PA (Power Amplifier).

The seed light source 10 includes: a seed light generator (not shown) formed with a laser diode or a fiber laser device of a Fabry-Perot type or a fiber ring type, for example; and an optical switch 11 that switches between outputting and not outputting the seed light to the outside of the seed light source 10. The optical switch 11 is formed with an AOM (Acoustic Optical Modulator), for example. The optical switch 11 is controlled to repeatedly switch between a low-loss state and a high-loss state, and is controlled to maintain a low-loss state or a high-loss state. In a case where the optical switch 11 is controlled to repeatedly switch between a low-loss state and a high-loss state, the seed light source 10 outputs pulsed seed light. In a case where the optical switch 11 is controlled to maintain a low-loss state, the seed light source 10 outputs continuous seed light. In a case where the optical switch 11 is controlled to maintain a high-loss state, the seed light source 10 does not output seed light. The optical switch 11 is located inside or outside the seed light generator. Other than an AOM, the optical switch 11 may be an micromachine optical switch, a LN modulator, or the like.

The seed light output from the seed light source 10 is not particularly limited, but maybe laser light with a wavelength of 1070 nm, for example. The seed light source 10 is connected to a seed light propagation fiber 15 formed with a core and a clad coating the core. The seed light output from the seed light source 10 propagates through the core of the seed light propagation fiber 15. The seed light propagation fiber 15 may be a single-mode fiber, for example. In that case, the seed light propagates as single-mode light through the seed light propagation fiber 15.

The pumping light source 20 is formed with laser diodes 21. In a case where the wavelength of the seed light is 1070 nm as described above, the pumping light source 20 outputs pumping light with a wavelength of 915 nm, for example. The respective laser diodes 21 of the pumping light source 20 are connected to pumping light propagation fibers 22, and the pumping light output from the laser diodes 21 propagates through the pumping light propagation fibers 22. The pumping light propagation fibers 22 may be multi-mode fibers, for example. In that case, the pumping light propagates as multi-mode light through the pumping light propagation fibers 22.

The amplification optical fiber 30 includes: a core; a clad coating the core; a plastic clad coating the clad; and a coating layer coating the plastic clad. One end of the amplification optical fiber 30 serves as an input terminal 31, and the other end serves as an output terminal 32. The refractive index of the clad is lower than the refractive index of the core, and the refractive index of the plastic clad is even lower than the refractive index of the clad. The material forming such a core may be an element such as germanium, which increases the refractive index, or silica doped with an active element serving as an amplification medium such as ytterbium (Yb), which is pumped by the pumping light output from the pumping light source 20, for example. Such an active element may be a rare-earth element, and the rare-earth element may be thulium (Tm), cerium (Ce), neodymium (Nd), europium (Eu), erbium (Er), or the like, other than the above mentioned Yb. Other than the rare-earth element, the active element may be bismuth (Bi) or the like. The material forming the clad may be pure silica not doped with any dopant, for example. The material forming the plastic clad may be an ultraviolet curable resin, for example, and the material forming the coating layer may be an ultraviolet curable resin different from the resin forming the plastic clad, for example.

The combiner 40 connects the seed light propagation fiber 15 and the respective pumping light propagation fibers 22 to the input terminal 31 of the amplification optical fiber 30. Specifically, at the combiner 40, the core of the seed light propagation fiber 15 is end-connected to the core of the amplification optical fiber 30, and further, the core of each of the pumping light propagation fibers 22 is end-connected to the clad of the amplification optical fiber 30. As a result the seed light output from the seed light source 10 is input to the core of the amplification optical fiber 30, and the pumping light output from the pumping light source 20 is input to the clad of the amplification optical fiber 30.

The monitor unit 50 includes an optical isolator 51 provided in a middle section of the seed light propagation fiber 15, and an optical detector 52 that detects light isolated by the optical isolator 51. The optical isolator 51 is formed with an optical coupler or the like having a fusion stretched portion, for example. The light isolator 51 isolates light that is output from the input terminal 31 of the amplification optical fiber 30 toward the seed light source 10, and outputs the isolated light to the optical detector 52. The optical detector 52 is formed with a photoelectric conversion element such as a photodiode. The optical detector 52 photoelectrically converts the light input from the optical isolator 51, and outputs a signal to the control unit 60 based on the intensity of the light input from the optical isolator 51.

The control unit 60 is formed with discrete components, and includes a light source controller 61 and a comparator 62 that compares the voltage of the signal input from the optical detector 52 with a reference voltage. The light source controller 61 is formed with a part that controls stationary operations, and a part that receives an output from the comparator 62 and emits a non-stationary output. Those parts are formed with a logical gate or an arithmetic unit such as a CPU (Central Processing Unit). The comparator 62 compares the signal input from the optical detector 52 with the reference voltage, and outputs the result to the light source controller 61. The light source controller 61 also controls the optical switch 11 of the seed light source 10. As a result the seed light output from the seed light source 10 is light based on a control signal from the light source control unit 61.

Next, operations of the laser device 1 are described. In the following, operations to be performed in a case where pulsed light is output from the laser device 1 are described.

First, a control signal is input from the light source controller 61 to the optical switch 11. The optical switch 11 then performs a switching operation so that switching between a low-loss state and a high-loss state is repeatedly performed in predetermined and constant cycles (T). As a result pulsed seed light that is synchronized with the switching operation is output from the seed light source 10 in constant cycles. The seed light output from the seed light source 10 at this point has a wavelength of 1070 nm as described above, for example. The seed light output from the seed light source 10 propagates through the core of the seed light propagation fiber 15, and is input to the combiner 40.

Meanwhile, pumping light is output from each of the laser diodes 21 of the pumping light source 20. The pumping light output from each of the laser diodes 21 of the pumping light source 20 has a wavelength of 915 nm as described above, for example. The pumping light output from the respective laser diodes 21 propagates through the pumping light propagation fibers 22, and is input to the combiner 40.

The pulsed seed light that is input to the combiner 40 in the above manner is then input to the core via the input terminal 31 of the amplification optical fiber 30, and propagates through the core. Meanwhile, the pumping light that is input to the combiner 40 is then input to the clad via the input terminal 31 of the amplification optical fiber 30, and propagates mainly through the clad.

When the pumping light passes through the core in the amplification optical fiber 30, the pumping light is absorbed by the active element with which the core is doped, and the active element is pumped. The pumped active element then causes stimulated emission, and the pulsed seed light is amplified by the stimulated emission. Pulsed output light is then output from the output terminal 32 of the amplification optical fiber 30.

Figure 2:
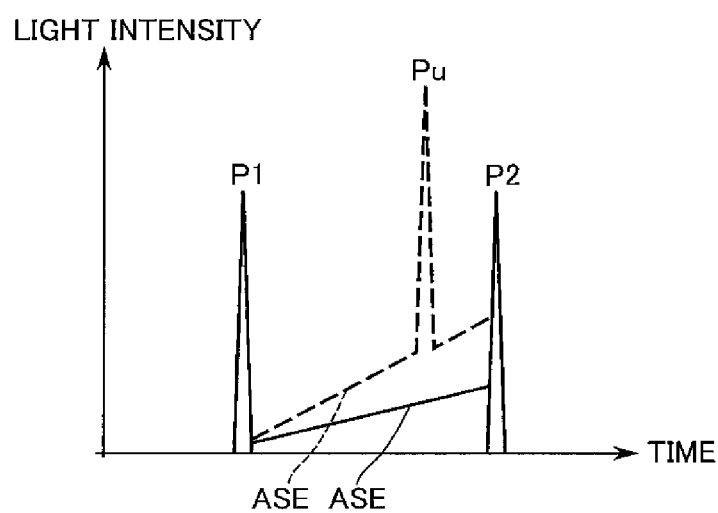
FIG. 2 is a diagram schematically showing intensities of light that is output from the amplification optical fiber shown in FIG. 1.

FIG. 2 is a diagram schematically showing intensities of light output from the amplification optical fiber 30 shown in FIG. 1. It should be noted that P1 and P2 in FIG. 2 represent intensities of light that is output from the output terminal 32 of the amplification optical fiber 30, and the ASE in FIG. 2 represents intensities of light that is output from the input terminal 31 of the amplification optical fiber 30 toward the seed light source 10.

As shown in FIG. 2, the pulsed output light P1 and the pulsed output light P2 are output from the output terminal 32 of the amplification optical fiber 30 in synchronization with the pulsed seed light that is output in the constant cycles (T). After the output light P1 is output, the level of the pumped state of the active element in the amplification optical fiber 30 is temporarily lowered. While the output light P1 and the output light P2 are output (a pulse interval: a cycle T), the seed light is not input from the seed light source 10 to the amplification optical fiber 30, and only the pumping light is input from the pumping light source 20. Therefore, the level of the pumped state of the active element in the amplification optical fiber 30, which has been temporarily lowered, is made gradually higher with time during the time from when the output light P1 is output till when the output light P2 is output. As the level of the pumped state becomes higher, the active element in the amplification optical fiber 30 emits spontaneous emission light, and the ASE, which is the amplified spontaneous emission light, is output from both ends of the amplification optical fiber 30. At this point, part of the ASE output from the output terminal 32 of the amplification optical fiber 30 is reflected by an object to be processed or the like, and is again input to the amplification optical fiber. The ASE that is again input to the amplification optical fiber 30 is again amplified at the amplification optical fiber 30, and is output from the input terminal 31 of the amplification optical fiber 30 toward the seed light source 10.

During a pulse interval, the level of the pumped state of the active element in the amplification optical fiber 30 is made gradually higher as described above. Accordingly, the intensity of the ASE output from the amplification optical fiber 30 toward the seed light source 10 becomes gradually higher as shown in FIG. 2.

The ASE that is output toward the seed light source 10 is at least partially isolated at the optical isolator 51 of the monitor unit 50, and is input to the optical detector 52. The optical detector 52 outputs a signal to the control unit 60, based on the intensity of the light that is input from the optical isolator 51.

While the seed light is output from the seed light source 10, or while the output light P1 and the output light P2 are output, the control unit 60 ignores the signal that is output from the optical detector 52. When the signal is input from the optical detector 52 during a pulse interval, the comparator 62 in the control unit 60 compares the voltage of the signal with a reference voltage Vcc. If the voltage of the signal output from the optical detector 52 is lower than the reference voltage Vcc, the comparator 62 outputs a signal indicating that the voltage of the signal from the optical detector 52 is low, to the light source controller 61. This signal is a low-voltage signal, for example. In that case, the light source controller 61 does not output any specific control signal to the optical switch 11. That is, if the ASE input to the monitor unit 50 has a lower intensity than a predetermined intensity, the light source controller 61 controls the seed light source 10 to perform a regular operation. As a result the seed light source 10 does not output the seed light at this point. Therefore, the level of the pumped state of the active element in the amplification optical fiber 30 becomes even higher with time. If the voltage of the signal input from the optical detector 52 to the comparator 62 is lower than the reference voltage Vcc, the light source controller 61 controls the optical switch 11 at the time of the next seed light output, so that the seed light source 10 outputs the seed light. In this manner, the output light P2 next to the output light P1 is output.

In a case where, during the pulse interval equal to the cycle T, the intensity of the ASE that is output from the input terminal 31 of the amplification optical fiber 30 toward the seed light source 10 is equal to or higher than the predetermined intensity, on the other hand, the voltage of the signal output from the optical detector 52 becomes higher, and the comparator 62 determines that the voltage output from the optical detector 52 is higher than the reference voltage Vcc. In that case, the comparator 62 outputs a signal indicating that the voltage of the signal from the optical detector 52 is high, to the light source controller 61. This signal is a high-voltage signal, for example. When this signal is input to the light source controller 61, the light source controller 61 controls the optical switch 11 to forcibly cause the seed light source 10 to output the seed light, though it is during the pulse interval. That is, if the intensity of the ASE input to the monitor unit 50 is equal to or higher than the predetermined intensity, the light source controller 61 temporarily shorten the pulse interval, to forces to output the seed light the seed light source 10. The active element in the amplification optical fiber 30 is made to cause stimulated emission by the output seed light, and the level of the pumped state is lowered.

If the level of the pumped state of the active element in the amplification optical fiber 30 is very high, or where the intensity of the re-input ASE is high, there is a possibility that abnormal oscillations of the amplification optical fiber 30 will be induced, and high-intensity light Pu as indicated by a dashed line in FIG. 2 will be output. Therefore, the predetermined intensity of the ASE should be lower than the intensity achieved immediately before the high-intensity light Pu shown in FIG. 2 is output. However, to improve the rise of the output light P1 and the output light P2 when the output light P1 and the output light P2 are output in response to a seed light input, the active element in the amplification optical fiber 20 is pumped to a certain high level during the pulse interval. Therefore, the predetermined intensity of the ASE is preferably equal to the intensity of the ASE output immediately before the high-intensity light Pu shown in FIG. 2 is output. Such an intensity is measured beforehand, and the reference voltage Vcc and the like are set so that the high-intensity light Pu shown in FIG. 2 is not output.

As described above, in the laser device of the invention, the intensity of light that is output from the amplification optical fiber 30 is monitored between the seed light source 10 and the amplification optical fiber 30, while seed light is not input to the amplification optical fiber 30. In this manner, the intensity of the light that is output from the amplification optical fiber 30 can be detected. In a situation where the seed light is not input to the amplification optical fiber 30, however, the ASE is output from the output terminal 32 of the amplification optical fiber 30. The ASE might be reflected by an object to be processed or the like, and be again input to the amplification optical fiber 30. If the level of the pumped state of the active element in the amplification optical fiber 30 is very high at this point, or if the intensity of the re-input ASE is high at this point, there is a possibility that abnormal oscillations of the amplification optical fiber 30 will be induced, and the high-intensity light Pu as indicated by the dashed line in FIG. 2 will be output. In the laser device 1 of the invention, however, the intensity of the light that is output from the amplification optical fiber 30 can be detected between the seed light source 10 and the amplification optical fiber 30. Accordingly, the intensity of the ASE that is output from the amplification optical fiber 30 toward the seed light source 10 can be detected. The intensity of the ASE that is output from the amplification optical fiber 30 toward the seed light source 10 results from the influence of the pumped state of the active element in the amplification optical fiber 30 and the intensity of the ASE that is re-input to the amplification optical fiber 30. Therefore, if the intensity of the ASE is high, at least one of the following situations occurs: the level of the pumped state of the active element in the amplification optical fiber 30 is high; and the intensity of the re-input ASE is high. Therefore, in a case where the ASE that is input to the monitor unit has an intensity equal to or higher than the predetermined intensity, a sign of abnormal oscillations is detected in the amplification optical fiber 30, and the seed light source 10 is forcibly made to output the seed light, though it is during a pulse interval. In this manner, the level of the pumped state of the active element can be lowered. Thus, abnormal oscillations in the amplification optical fiber 30 can be prevented.

(Second Embodiment)

Figure 3:
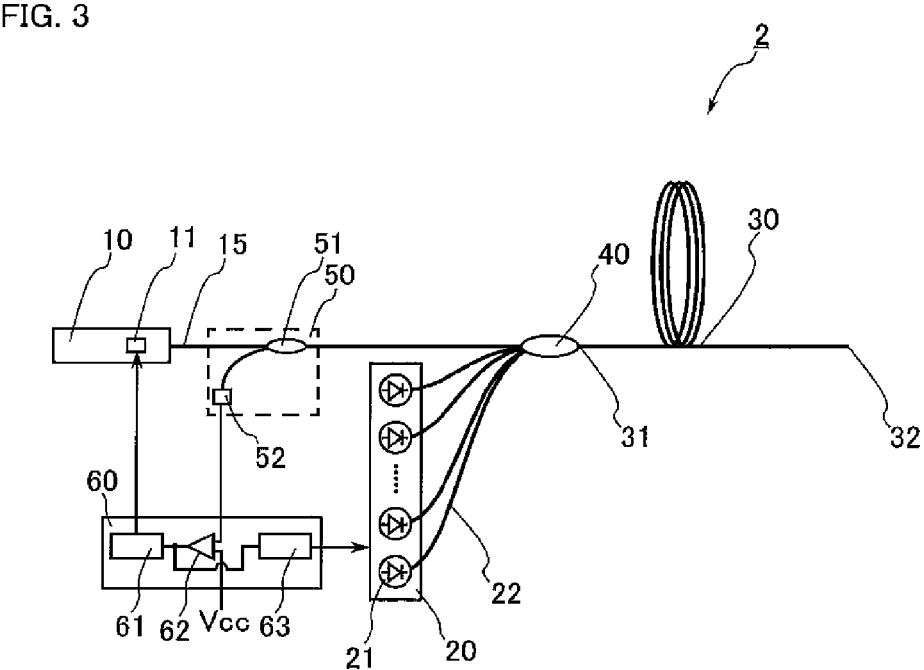
FIG. 3 is a diagram showing a laser device according to a second embodiment of the invention.

Referring now to FIG. 3, a second embodiment of the invention is described in detail. It should be noted that components that are identical or similar to those in the first embodiment are denoted by the same reference numerals as those used in the first embodiment, and the same explanation will not be repeated. FIG. 3 is a diagram showing a laser device according to a second embodiment of the invention.

As shown in FIG. 3, a laser device 2 of this embodiment differs from the laser device 1 of the first embodiment in that the control unit 60 includes a pumping controller 63 that controls the laser diodes 21 of the pumping light source 20. As a result the pumping light that is output from the pumping light source 20 is light based on a control signal from the pumping controller 63. The comparator 62 compares a signal input from the optical detector 52 with a reference voltage, and outputs the result to the light source controller 61 and the pumping controller 63.

In this laser device 2, when the voltage of the signal input from the optical detector 52 is lower than the reference voltage Vcc, the comparator 62 outputs a signal indicating that the voltage of the signal from the optical detector 52 is low, to the light source controller 61 and the pumping controller 63. This signal is a low-voltage signal, for example. In that case, the light source controller 61 and the pumping controller 63 do not output any specific control signal to the seed light source 10 and the pumping light source 20. That is, if the ASE that is input to the monitor unit 50 has a lower intensity than a predetermined intensity, the light source controller 61 and the pumping controller 63 control the seed light source 10 and the pumping light source 20 to perform regular operations. Therefore, the seed light source 10 does not output seed light at this point, and the pumping light source 20 continues to output pumping light. As a result the level of the pumped state of the active element in the amplification optical fiber 30 becomes even higher with time. If the voltage of the signal input from the optical detector 52 to the comparator 62 is lower than the reference voltage Vcc, the light source controller 61 controls the optical switch 11 at the time of the next seed light output, so that the seed light source 10 outputs the seed light. In this manner, the output light P2 next to the output light P1 is output.

If the comparator 62 determines that the voltage output from the optical detector 52 is higher than the reference voltage Vcc, on the other hand, the comparator 62 outputs a signal indicating that the voltage of the signal from the optical detector 52 is high, to the light source controller 61 and the pumping controller 63. This signal is a high-voltage signal, for example. When this signal is input to the light source controller 61 and the pumping controller 63, the light source controller 61 controls the optical switch 11 to forcibly cause the seed light source 10 to output the seed light though it is during a pulse interval, and the pumping controller 63 controls the pumping light source 20 to lower the intensity of the pumping light to be output from each laser diode. That is, if the intensity of the ASE that is input to the monitor unit 50 is equal to or higher than the predetermined intensity, the light source controller 61 and the pumping controller 63 control the seed light source 10 and the pumping light source 20 to forces to output the seed light from the seed light source 10 and lower the intensity of the pumping light to be output from the pumping light source 20. As a result the active element in the amplification optical fiber 30 is made to cause stimulated emission by the output seed light, and the level of the pumped state is made lower. Also, the intensity of the pumping light to be input to the amplification optical fiber 30 becomes lower. Thus, the level of the pumped state of the active element becomes even lower. The pumping controller 63 preferably controls the pumping light source 20 until the intensity of the ASE that is input to the monitor unit becomes at least lower than the predetermined intensity, so that the intensity of the pumping light to be output from the pumping light source 20 is made lower.

In the above laser device 2, the intensity of the pumping light that is input to the amplification optical fiber 30 is made lower, so that the level of the pumped state of the amplification optical fiber is lowered. Accordingly, abnormal oscillations in the amplification optical fiber can be prevented, and a higher degree of safety is achieved.

Although the invention has been described so far through the first and second embodiments as examples, the invention is not limited to those embodiments.

For example, in each of the first and second embodiments, a fiber laser device that uses the amplification optical fiber 30 as the amplifier, the seed light source 10 as the light source, and the pumping light source 20 as the pumping unit has been described as an example. However, the invention does not necessarily relates to fiber laser devices, as long as it relates to a laser device in which light to be amplified is input to an amplifier having an amplification medium to be pumped by a pumping unit. For example, the amplifier may be formed with a semiconductor amplifier, and the pumping unit may be a voltage source that applies a voltage to the semiconductor amplifier. In that case, the amplification medium in the amplifier is pumped by the voltage source, and ASE is generated while the light to be amplified is not input. Therefore, the output ASE might be reflected by an object to be processed or the like, and be again input to the amplifier. The ASE amplified by the amplifier might be then output toward the light source. By monitoring the ASE that is output toward the light source, abnormal oscillations in the amplifier can be sensed in advance. In a case where the intensity of the ASE output toward the light source is higher than a predetermined intensity, a sign of abnormal oscillations is detected, and the light to be amplified should be output from the light source under the control of the light source controller. In this manner, abnormal oscillations can also be prevented in the semiconductor amplifier. In a case where the intensity of the ASE output toward the light source is higher than the predetermined intensity, the light to be amplified is output from the light source, and a control operation may be performed so that the voltage to be applied to the semiconductor amplifier from the voltage source is lowered, or the voltage source stops applying the voltage, or the like.

The invention can also be applied to solid-state lasers, gas lasers, and the like. For example, in a MO-PA excimer laser, a dichroic mirror is provided between the MO and the PA, and counter ASE from the PA is monitored during pulse intervals.

Also, in the first and second embodiments, the control unit 60 is formed with discrete components. However, at least part of the control unit 60 may be formed with a microcomputer, for example. In a case where at least part of the control unit 60 is formed with a microcomputer, the value of the voltage to be input to the control unit 60 is not compared with the reference voltage Vcc, but at least one of the seed light source 10 and the pumping light source 20 may be controlled by predicting that the ASE to be output from the amplification optical fiber 30 will become equal to the predetermined intensity, based on the value of the voltage of the signal input to the control unit 60 and a variation of the voltage.

In the second embodiment, when a signal indicating that the voltage of the signal from the optical detector 52 is high is input to the pumping controller 63, the pumping controller 63 controls the pumping light source 20 to lower the intensity of the pumping light to be output from each laser diode. However, the pumping light source may be controlled to stop each of the laser diodes 21. In that case, the level of the pumped state of the active element in the amplification optical fiber 30 can be lowered with a higher degree of certainty.

In the second embodiment, if the intensity of ASE input to the monitor unit 50 is equal to or higher than the predetermined intensity, the light source controller 61 and the pumping controller 63 control the seed light source 10 and the pumping light source 20 to forces to output the seed light from the seed light source 10 and to weaken the output of the pumping light from the pumping light source 20. However, the invention is not limited to that. For example, the pumping controller 63 may control the pumping light source 20 to weaken the output of the pumping light or control the pumping light source 20 to stop. The light source controller 61 may not perform the control operation to forces to output the seed light form the seed light source 10. However, the level of the pumped state of the active element can be lowered more quickly, where the seed light source 10 outputs the seed light.

In the laser devices of the first and second embodiments, pulsed seed light is output in constant cycles. However, continuous light may be output from the seed light source 10. In that case, there is a possibility that abnormal oscillations will occur when the continuous light is stopped. In the laser devices of the invention, however, the abnormal oscillations can be prevented.

INDUSTRIAL APPLICABILITY

According to the invention, a laser device that can prevent abnormal oscillations in the amplifier is provided.

Description of Reference Numerals 1, 2 . . . laser device
10 . . . seed light source (light source)
11 . . . optical switch
15 . . . seed light propagation fiber
20 . . . pumping light source (pumping unit)
21 . . . laser diodes
22 . . . pumping light propagation fiber
30 . . . amplification optical fiber (amplifier)
31 . . . input terminal
32 . . . output terminal
40 . . . combiner
50 . . . monitor unit
51 . . . optical isolator
52 . . . optical detector
60 . . . control unit
61 . . . light source controller
62 . . . comparator
63 . . . pumping controller

The invention claimed is:

1. A laser device comprising:
    a light source configured to output light to be amplified;
    a pumping unit;
    an amplifier configured to amplify the light to be amplified with an amplification medium pumped by the pumping unit;
    a monitor unit configured to monitor an intensity of light output from the amplifier, the monitor unit being provided between the light source and the amplifier; and
    a light source controller configured to control the light source,
    wherein, when the light output from the amplifier and input to the monitor unit has an intensity equal to or higher than a predetermined intensity while the light to be amplified is not input to the amplifier, the light source controller forces to output the light to be amplified from the light source.

2. The laser device according to claim 1, wherein
    the light source outputs pulsed light to be amplified in constant cycles, and,
    when the light output from the amplifier and input to the monitor unit has an intensity equal to or higher than the predetermined intensity, the light source controller shortens the cycles in which the light to be amplified is output to force to output the light to be amplified from the light source.

3. The laser device according to claim 1, further comprising a pumping controller configured to control the pumping unit,
    wherein, when the light output from the amplifier and input to the monitor unit has an intensity equal to or higher than the predetermined intensity, the pumping controller controls the pumping unit to lower a level of a pumped state of the amplification medium.

4. The laser device according to claim 3, wherein,
    when the light output from the amplifier and input to the monitor unit has an intensity equal to or higher than the predetermined intensity, the pumping controller stops the pumping unit.

5. The laser device according to claim 1, wherein
    the pumping unit is a pumping light source configured to output pumping light, and
    the amplifier is an amplification optical fiber through which the light to be amplified propagates, the amplification optical fiber being doped with an active element to be pumped by the pumping light source.

6. The laser device according to claim 5, wherein
    The light source outputs pulsed light to be amplified in constant cycles, and,
    when the light output from the amplifier and input to the monitor unit has an intensity equal to or higher than the predetermined intensity, the light source controller shortens the cycles in which the light to be amplified is output to force to output the light to be amplified from the seed light source.

7. The laser device according to claim 5, further comprising
    a pumping controller configured to control the pumping unit,
    wherein, when the light output from the amplifier and input to the monitor unit has an intensity equal to or higher than the predetermined intensity, the pumping controller controls the pumping unit to lower a level of a pumped state of the amplification medium.

8. The laser device according to claim 7, wherein,
    when the light output from the amplifier and input to the monitor unit has an intensity equal to or higher than the predetermined intensity, the pumping controller stops the pumping unit.

* * * * *